United States Patent [19]

Kreuze et al.

[11] Patent Number: 4,854,632
[45] Date of Patent: Aug. 8, 1989

[54] STORAGE COMPARTMENT

[75] Inventors: Kenneth D. Kreuze; Eric D. Rennie, both of Holland, Mich.

[73] Assignee: Prince Corporation, Holland, Mich.

[21] Appl. No.: 47,297

[22] Filed: May 8, 1987

[51] Int. Cl.⁴ ................................................ B60R 7/06
[52] U.S. Cl. ................................. 296/37.12; 296/37.8; 160/201
[58] Field of Search ............ 296/37.1, 37.5, 37.8, 296/37.9, 37.12, 37.13; 224/42.42, 42.43, 273, 42.05; 312/297, 242; 160/201

[56] References Cited

U.S. PATENT DOCUMENTS

| | | | |
|---|---|---|---|
| 1,505,728 | 8/1924 | Rayford | 312/297 X |
| 2,000,162 | 5/1935 | Buscham | 206/37 |
| 2,111,434 | 3/1938 | Morrison | 296/37.12 X |
| 2,155,962 | 4/1939 | Visser | 312/190 |
| 2,805,910 | 9/1957 | Townsend | 312/297 X |
| 3,285,093 | 11/1966 | Sellmeyer | 74/566 |
| 3,414,318 | 12/1968 | Porsche | 296/37.6 |
| 3,484,573 | 12/1969 | Tingley | 312/297 X |
| 4,131,173 | 12/1978 | Boersma | 180/90 |
| 4,552,399 | 11/1985 | Atarashi | 296/37.12 |

Primary Examiner—Russell D. Stormer
Attorney, Agent, or Firm—Price, Heneveld, Cooper, DeWitt & Litton

[57] ABSTRACT

A storage compartment for recessed mounting into the top of the instrument panel of a vehicle includes a flexible cover for movement between a position closing a storage container and an open position in which the cover extends around the storage container. The flexible cover is a tambour-type cover with an endless loop connection and which is guidably supported by the storage container.

14 Claims, 4 Drawing Sheets

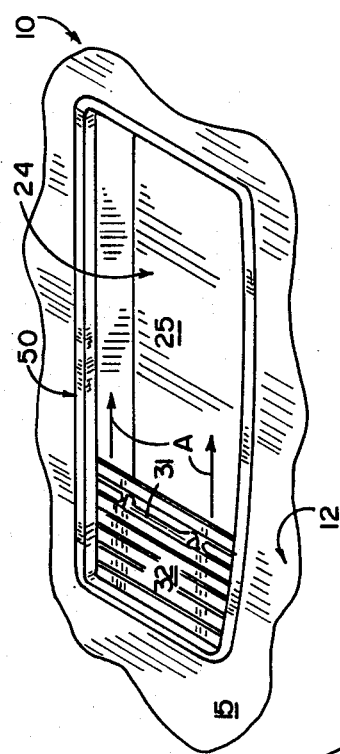
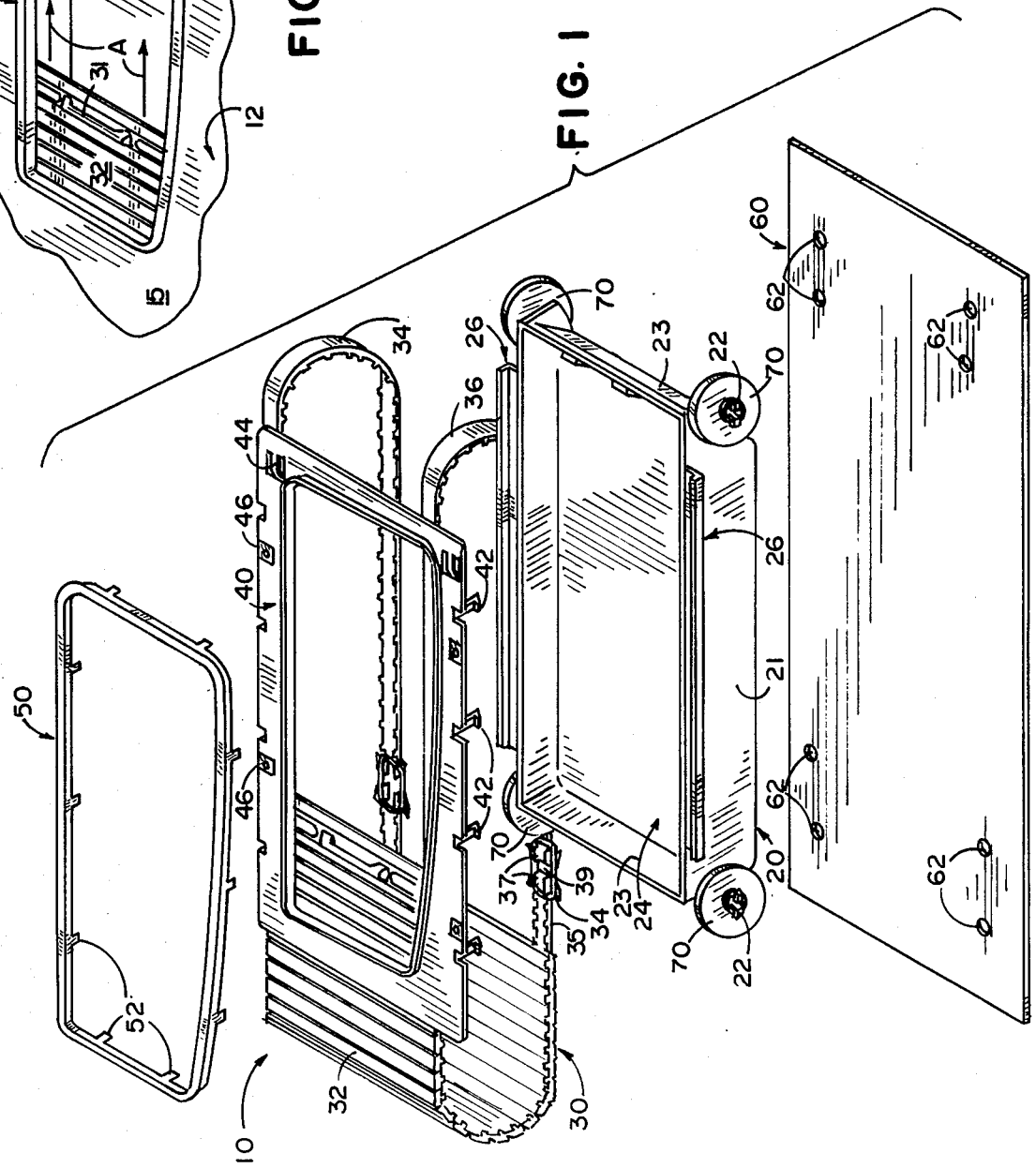

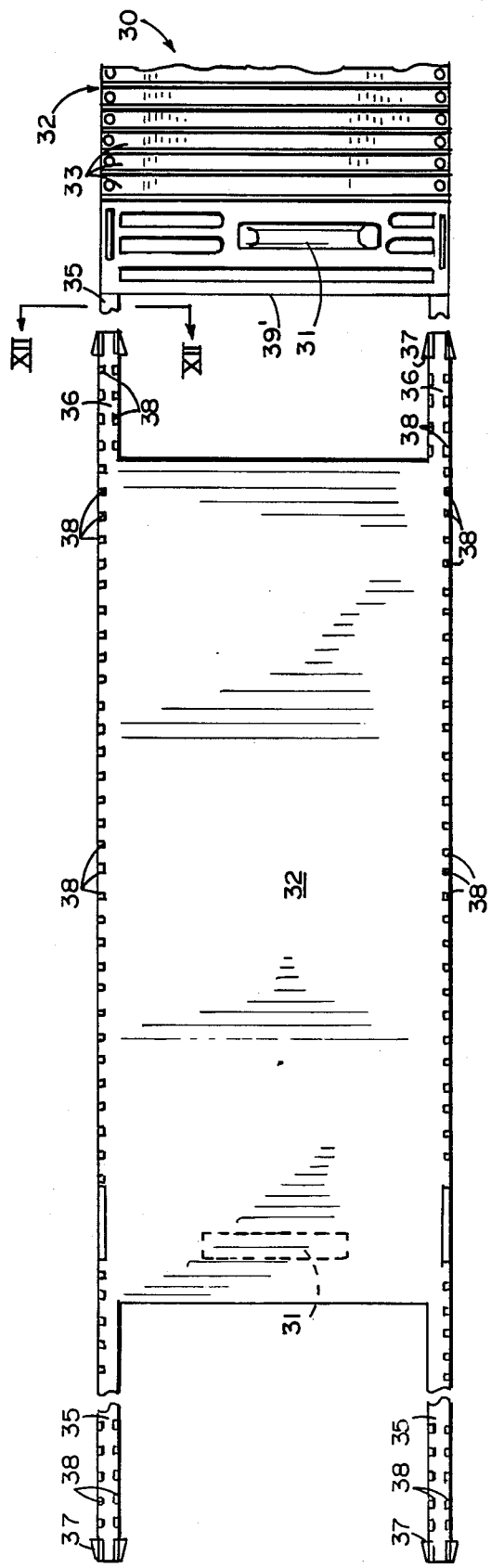
FIG. 11
FIG. 10
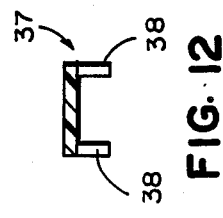
FIG. 12
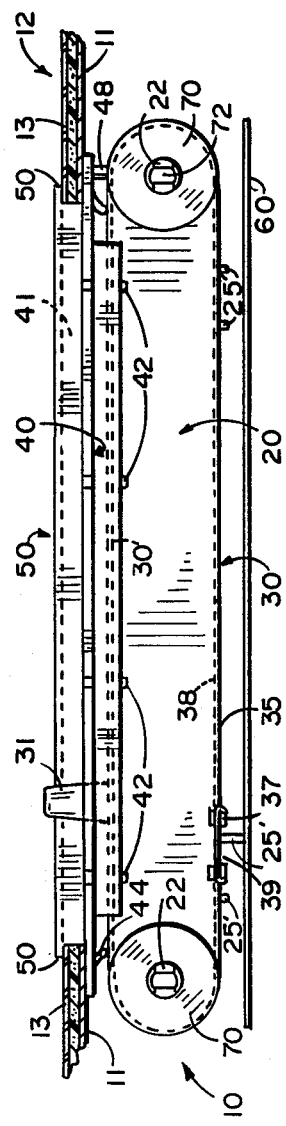
FIG. 3

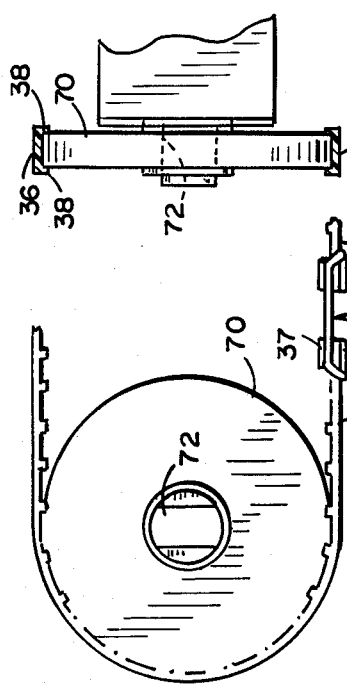
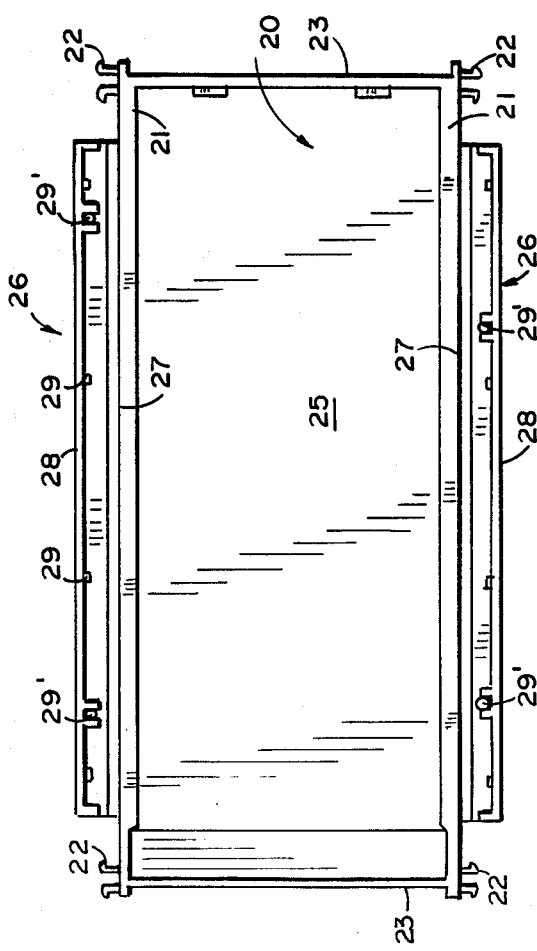
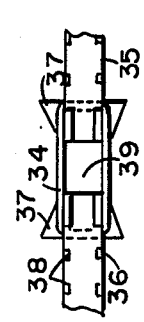
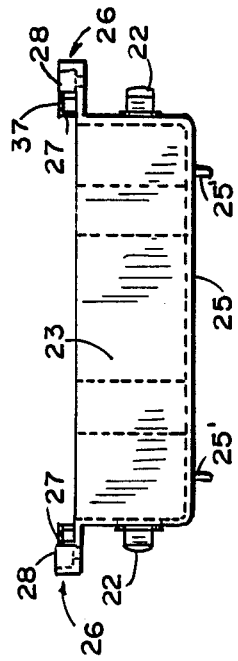
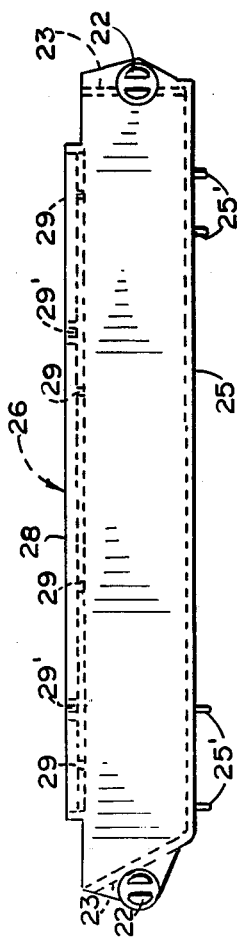

STORAGE COMPARTMENT

BACKGROUND OF THE INVENTION

The present invention pertains to a storage compartment and particularly to one for use in the instrument panel of a vehicle.

With the down sizing of vehicles, glove box storage has become increasingly smaller as the size of the vehicle instrument panel diminishes. In order to accommodate storage of personal items, vehicles may include door pockets, center consoles with storage compartments and, of course, diminished sized glove boxes. Some vehicles provide integral uncovered recesses formed in the top surface of the instrument panel for holding items, however, rapid acceleration and deceleration of the vehicle can dislodge items positioned in such open bins from the instrument panel and can create a safety hazard.

SUMMARY OF THE PRESENT INVENTION

The system of the present invention provides a storage compartment which is particularly adapted for recessed mounting downwardly into the top of the instrument panel of a vehicle and one which includes a flexible cover for movement between a position closing a storage container and an open position in which the cover extends around the storage container. In the preferred embodiment of the invention, the storage container is generally rectangular in shape to conform to the vehicle instrument panel and thereby provide as large a storage space possible for the similarly shaped instrument panel. In the preferred embodiment of the invention, the flexible cover comprises a tambour-type cover with an endless loop connection guidably supported by the storage container.

Such a system provides a compact and attractive storage compartment for mounting within a vehicle either as original equipment or as an add-on accessory and a storage compartment which can be enclosed for safety and convenience. These and other features, objects and advantages of the present invention will become apparent upon reading the following description thereof together with reference to the accompanying drawings in which:

BRIEF DESCRIPTION OF THE DRAWINGS

FIG. 1 is a perspective exploded view of the storage compartment of the present invention;

FIG. 2 is a fragmentary perspective view of the storage compartment of the present invention shown mounted in the instrument panel of a vehicle;

FIG. 3 is a front elevational view of the storage compartment assembly also showing in fragmentary cross-section its relationship to the vehicle instrument panel when installed;

FIG. 4 is a top plan view of the storage container portion of the compartment seen also in FIGS. 1 and 3;

FIG. 5 is a front elevational view of the storage container shown in FIG. 4;

FIG. 6 is a right side elevational view of the storage container shown in FIG. 5;

FIG. 7 is an enlarged fragmentary front elevational view of one of the four guide wheels and the interconnection of legs of the cover shown also in FIGS. 1 and 3;

FIG. 8 is a right side elevational view of the wheel shown in FIG. 7 and illustrating its relationship to the cover legs;

FIG. 9 is an enlarged fragmentary top plan view of a portion of the structure shown in FIG. 7;

FIG. 10 is a bottom plan view of the cover partly broken away;

FIG. 11 is a fragmentary top plan view of a portion of the flexible cover;

FIG. 12 is an enlarged cross-sectional view taken along section lines XII—XII of FIG. 11;

DETAILED DESCRIPTION OF THE PREFERRED EMBODIMENT

Figure 15:
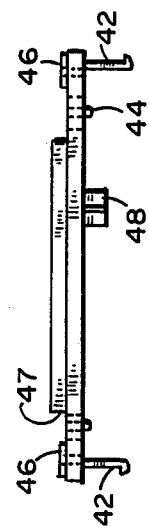
FIG. 15 is a left side elevational view of the mounting plate.

Referring initially to FIGS. 1 and 2 there is shown a storage compartment 10 embodying the present invention and which is particularly adapted for mounting within the instrument panel 12 of a vehicle such as an automobile. In the preferred embodiment the storage compartment 10 is designed to fit under the top 15 (FIG. 1) and extend downwardly on the passenger side of the instrument panel although it could be used in other areas of the vehicle. The storage compartment 10 comprises a storage container 20, a flexible endless loop cover 30, a mounting plate 40 for securing the storage container with the cover mounted thereto within the instrument panel 12 and a trim bezel 50. Below the floor of container 20 there is provided a protector plate 60 shown in FIGS. 1 and 3 which protects roller means such as wheels 70 at each of the four lower corners of the container for preventing damage to the wheels and cover during assembly and use of the storage compartment. Some installations may not require the additional protector plate.

The compartment 10, as shown in FIGS. 2 and 3, is secured to the undersurface of sheet metal 11 of the instrument panel 12 during manufacture of the vehicle by bolting a mounting plate 40 and flange 26 of the container 20 to the sheet metal portion 11 of the instrument panel. The foam covering and upholstery 13 is previously cut to conform to the opening 24 of the compartment then trimmed by bezel 50. The mounting plate 40 is secured to the storage container 20 partially by a plurality of interengaging tabs 42 while the wheels 70 are snap fitted on stub axles 22 formed at the corners of the storage container as described in greater detail below.

The cover 30 includes a tamboured-type cover segment 32 with legs 35 and 36 which define straps extending longitudinally outwardly from opposite edges and ends of segment 32 and are joined at their free ends by an elastic coupling 34 such as an endless loop rubber band. This defines an endless loop cover 30 which extends under mounting plate 40 and above the opening 24 of storage container 20. The cover also extends around wheels 70 and under the floor 25 of the container. The wheels 70 together with guide means formed in the storage container 20 as described below, serves to guidably support the cover for movement in a direction indicated by arrow A to a closed position or to the left as seen in its partially open position of FIG. 2 to a fully open position moved to the left as seen in FIG. 2 in a direction opposite arrow A. To facilitate the use of the cover, an upstanding handle 31 is mounted adjacent the leading edge of the tambour section 32 of cover 30. Having briefly described the overall construction of the storage compartment, a detailed description of the components is presented below in connection with FIGS. 4-15.

The storage container 20 is shown in detail in FIGS. 4-6 and comprises a generally rectangular structure having sidewalls 21, end walls 23 and a floor 25 defining a storage bin with an opening 24 for storing personal items in the vehicle. A pair of guide flanges 26 extend outwardly from the top edge of each of the sidewalls 21 and as best seen in FIG. 6, each include an upwardly projecting longitudinally extending rectangular track 27 over which the legs 35 and 36 of cover 30 extend as shown in cross-section in FIG. 6. Each of the outwardly projecting flanges 26 also include an upwardly turned lip 28 to space plate 40 vertically above the cover and for preventing the legs of cover 30 from pulling outwardly over the sidewalls of the structure. Flanges 26 also include slots 29 spaced along the horizontally extending portion thereof for lockably receiving tabs 42 of the mounting plate 40. Suitable apertures 29' are also provided in the flanges for receiving fasteners for securing the assembly 10 to the vehicle instrument panel.

Each of the stub axles 22 as best seen in FIGS. 4 and 5 include a pair of resilient arcuate segments over which the guide wheels 70 (FIGS. 7 and 8) are fitted. The wheels provide as best seen in FIG. 3 and as illustrated in FIG. 8, a movable guide and support for the legs 35 and 36 and flexible section 32 of cover 30 as the cover is moved between an open and closed position. The cover extends slightly below the mounting plate 40 and adjacent and spaced below and slightly outwardly from the junction of the sidewalls 21 and floor 25 of the storage container 20 and is supported primarily by wheels 70 and flanges 26. Each wheel 70 includes a central reinforced aperture 72 and has a width slightly less than the width of the U-shaped leg segments 38 of the cover for allowing the cover to move while rotating the wheels 70 with respect to the stub axles 22. The floor 25 of storage compartment 20 includes a plurality of spaced downwardly projecting tab members 25' which as described below are employed for mounting the protective plate 60 thereto. Container 20 is integrally molded of a suitable polymeric material such as polycarbonate.

Cover 30 is shown in detail in FIGS. 10-12 and includes a flexible cover section 32 with a plurality of parallel spaced ridges 33 forming a flexible tambour-type member with a handle 31 extending upwardly adjacent one edge thereof. Extending outwardly from opposite ends of section 32 and extending longitudinally along the opposite elongated edges of the rectangular tambour section 32 are a pair of straps or legs 35 and 36 for wrapping around the container 20. Each of the legs 35 and 36 terminate in a spade-shaped hook fastener 37 for receiving thereover a flexible rubber band or other suitable elastic fastener 34 as shown in FIGS. 1, 3, 8 and 9 to complete the endless loop cover 30.

As best seen i FIGS. 10 and 12 on the underside of each of the legs 35 and 36 as well as partially along the edge of the tambour section 32 are a plurality of downwardly projecting spaced tabs 38 which as seen in FIG. 12 define a generally U-shaped guide which extends over the track 27 (FIGS. 4 and 6) of storage container 20 as well as partially around the periphery of each of the wheels 70 for holding the cover in a laterally aligned position with respect to the container. The cover is made of a flexible resilient polymeric material such as the engineering elastomer Lomod available from the General Electric Company to assure that the legs 35, 36 and the tambour section 32 are relatively flexible and can form an enclosed loop when the ends 37 are held together by the elastic member 34. The length of the legs 36 and 35 are provided such there is a slight gap 39 between their connection as seen in FIGS. 1 and 3 to permit the resilient member 34 to place the legs of the cover in tension around guide wheels 70 and compensate for dimensional changes due to temperature and yet allow the cover to move relatively freely between open and closed positions with the cover also interacting with mounting plate 40 for providing a snap-closed position as described below.

Figure 13:
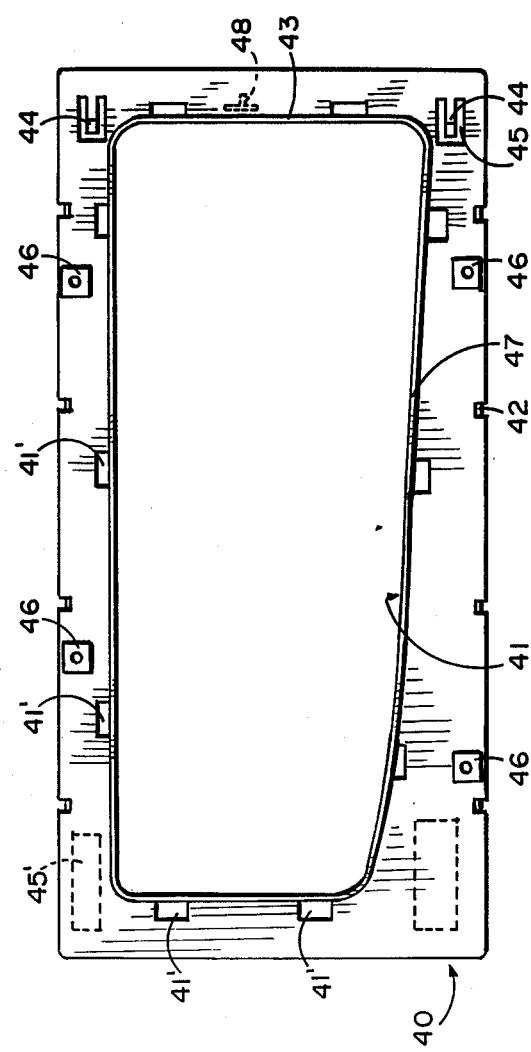
FIG. 13 is a top plan view of the mounting plate for the container seen also in FIGS. 1 and 3.
Figure 14:
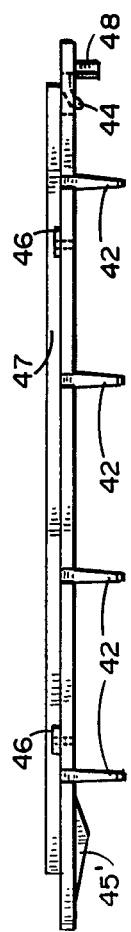
FIG. 14 is a front elevational view of the mounting plate.

The mounting plate 40 is seen in FIGS. 13-15 and like storage compartment 20, and protective plate 60, is made of a suitable polymeric material such as polycarbonate. The mounting plate 40 includes a generally trapezoidal opening 41 which is aligned over the storage container and defines the open top 24 as seen in FIG. 2 for the placement of articles in the container. The generally rectangular plate 40 includes spaced downwardly projecting snap-lock tabs 42 on each side which extend through the slots 29 of storage container 20 for holding the two members together. A pair of resilient arms 44 are formed by a U-shaped relief 45 in the plate 40. A pair of reinforced apertures 46 are formed on opposite sides of plate 40 and align with apertures 29' of the storage bin 20 to allow a fastening member such as a screw to extend through both the mounting plate 40 and container 20 for securing their assembly to the vehicle instrument panel metal 11.

Surrounding aperture 41 is a vertically upwardly extending ridge or lip 47 which cooperates with the trim bezel 50 as described below. Lip 47 can be curved to conform to the curvature of the instrument panel in which the storage compartment 10 is mounted. The top of plate 40 includes a plurality of spaced recesses 41' which align with tabs 52 of bezel 50 for receiving the bent tabs as discussed below. A pair of spaced ramps 45' are formed on the lower surface of plate 40 at the open end to space the body of cover 30 below the left edge of plate 60 as viewed in FIGS. 13 and 14 to prevent scolding of the exposed surface of the cover. A downwardly projecting end stop 48 is provided along the edge of opening end 43 of aperture 41 to allow the handle 31 to be spaced slightly from the edge for ease of grasping when the cover is in a closed position. When the cover is closed therefore, its leading edge 39' (FIG. 11) will engage stop 48 thereby spacing handle 31 away from the left edge 43 of aperture 41.

The steel trim bezel 50 is painted to match the vehicle interior and is shown in FIG. 1 and includes downwardly projecting deflectable tabs 52 and a generally L-shaped cross-section for, as seen in FIG. 3, covering the instrument panel upholstery 13 and providing a trim appearance thereto. In the preferred embodiment, the bezel 50 is press fit over lip 47 and tabs 52 extend through apertures in the instrument panel and deflect outwardly and under the foam and upholstery 13 of the vehicle and into recesses 41' during assembly. The protective plate 60 includes a plurality of apertures 62 which align with the tapered heat staked posts 25' extending downwardly from the floor 25 of container 20 as seen in FIGS. 3 and 5 such that the cover plate will fit over the posts in a position spaced from floor 25 and below wheels 70 and legs 35 and 36 of the cover 30 to prevent jamming or damage to the movable elements of the storage compartment during both assembly and subsequent use.

Thus, it is seen with the storage compartment of the present invention, a compact, convenient and self-contained storage system is provided for providing covered storage for personal items in a vehicle and one in which the cover is movably supported by guide and support means including a plurality of spaced wheels for ease of movement between open and closed positions. In the preferred embodiment of the invention, the system is particularly shaped and adapted to be a relatively shallow and elongated structure which conforms to the instrument panel of the passenger side of a vehicle for insertion downwardly in a recessed fashion in the instrument panel. It will become apparent to those skilled in the art that various modifications to the preferred embodiment of the invention can be made without departing from the spirit or scope thereof a defined by the appended claims.

The embodiments of the invention in which an exclusive property of privilege is claimed are defined as follows.

1. A covered recessed storage compartment for mounting downwardly in the instrument panel of a vehicle comprising:
   a generally rectangular open topped storage container including guide roller means at opposite lower edges thereof said container including guide and support means extending longitudinally along opposite upper edges thereof;
   flexible endless loop cover means extending over said open top, said cover means circumscribing said container and including a cover section having legs integral therewith and extending outwardly from opposite ends of said cover section; fastening means at the ends of said legs; means engaged by said fastening means for coupling respective legs extending from opposite ends of said section to each other and forming with the cover means and legs said loop cover means; said cover section supported for movement between open and closed positions partially around said container by said roller means and said guide and support means for moving said cover section between open and closed positions; and
   means for mounting said container and cover to the instrument panel of a vehicle.

2. The apparatus as defined in claim 1 wherein said means engaged by said fastening means includes resilient means for coupling aligned legs from opposite ends of said section together.

3. The apparatus as defined in claim 1 wherein said solid section includes alternate ridges and grooves to define a tambour section.

4. The apparatus as defined in claim 2 wherein the fastening means on each of said legs are located at an end remote from said section.

5. The apparatus as defined in claim 1 wherein said legs include spaced tabs cooperating with said roller means and guide and support means to retain said legs on said roller means and guide and support means of said container.

6. The apparatus as defined in claim 5 wherein said roller means comprises a relatively thin disk-shaped wheel rotatably mounted to each lower corner of said container.

7. The apparatus as defined in claim 6 wherein said means for mounting said container and cover to a vehicle includes a mounting plate coupled to said container and having aperture means for fastening to a vehicle instrument panel.

8. The apparatus as defined in claim 7 wherein said mounting plate includes means engaging said cover when moved to a closed position.

9. The apparatus as defined in claim 8 wherein said engaging means includes resilient arm means for releasably holding the cover in a closed position.

10. The apparatus as defined in claim 9 wherein said engaging means further includes stop means limiting the closing motion of said cover.

11. The apparatus of claim 5 in which the spaced tabs include tabs extending on opposite sides of said guide and support means and rollers.

12. The apparatus as defined in claim 1 wherein said legs, said cover and said means for coupling respective legs all include spaced tabs cooperating with said roller means and guide and support means to retain said loop cover means on said roller means and guide and support means of said container.

13. The apparatus of claim 12 in which the spaced tabs include tabs extending on opposite sides of said guide and support means and rollers.

14. A covered recessed storage compartment for mounting downwardly in a panel of a vehicle comprising:
   a storage container having a trapezoidal-shaped top for conforming to the shape of a vehicle panel, said container including a guide track extending along upper edges thereof and wheels at lower corners of said container;
   flexible endless loop cover means including a cover segment extending over said open top, said cover means including spaced tabs projecting outwardly therefrom for engaging said guide track and said wheels for guided movement of said cover means partially around said container between open and closed positions; and
   means for mounting said container and cover means downwardly in a vehicle instrument panel.

* * * * *